Patented Dec. 5, 1939

2,181,890

UNITED STATES PATENT OFFICE 2,181,890

PREPARATION OF SALTS OF INTERFACE MODIFYING AGENTS

Benjamin R. Harris, Chicago, Ill.

No Drawing. Application February 16, 1938,
Serial No. 190,703

18 Claims. (Cl. 260—400)

My invention relates to novel and improved methods for producing salts of so-called interface modifying agents.

Interface modifying agents or surface modifying agents are employed in the arts for many purposes, based upon their wetting, penetrating, laundering, detergent, lathering, sudsing, foaming, frothing, emulsifying and similar properties. To make use of these properties in the most desirable way, it is very often advantageous and, indeed, necessary to be able to prepare solutions, particularly aqueous solutions, which, at room temperatures or in the cold, contain at least several percent of such substances. In general, the interface modifying agents are prepared and marketed in the form of salts, usually the alkali metal or ammonium salts. Some of the salts of such agents are naturally more or less soluble in cold water or in the particular media in which they are to be employed than certain of the other salts. It happens, however, that, in the commercial processes of synthesizing various of the agents, a salt is produced which is relatively poorly soluble in cold water or the like. This, of course, seriously limits the field of utility of such agents.

I have found a very effective method whereby salts of interface modifying agents which possess relatively poor solubility in cold water or water at room temperature can be converted into different salts of said, otherwise the same interface, modifying agents, which latter have substantially greater or enhanced cold water solubility. Thus, for example, I have succeeded in converting salts of interface modifying agents having a solubility of 0.1% in water at room temperature into different salts of otherwise the same interface modifying agents with a solubility in the same medium of from 10% to 25% and even higher.

My invention is based upon the surprising discovery that base exchange substances such as zeolites, green sand and the like, possess the capacity for effecting a cationic replacement when solutions of salts of interface modifying agents are brought into contact therewith or are passed through a body thereof. While zeolites and the like have long been employed for effecting cationic replacements in connection with such inorganic salts as, for example, are encountered in connection with the softening of water or the like, it is indeed surprising that this action should take place in connection with such organic substances as those with which the present invention concerns itself, particularly since many of them are colloidal or semi-colloidal in character.

It will be seen, therefore, that my invention has its most important applicability, although not limited thereto, to the situation where a solution of at least several percent, preferably an aqueous solution containing from about 10% to 30% of an interface modifying agent in the cold or at room temperature, is desired and the interface modifying agent salt at hand is inadequately soluble. I have found that, at least in most cases, those interface modifying agent salts which possess relatively low solubility in cold water or water at room temperature, say to the extent of 0.1% to 1.0%, dissolve to a substantial degree in hot water, in many instances to the extent of 10% to 15% or more. The resulting hot solution containing, for example, 10% to 15% of the interface modifying agent salt is then passed into contact preferably with or through a bed of base exchange material containing replaceable cations of the salt desired. This results in the preparation of a solution containing a substantial percentage of an interface modifying agent in the form of a different salt which makes the interface modifying agent remain in solution notwithstanding the fact that said solution may be cooled down to room temperature or much below, or even further concentrated.

In order that the invention may become even clearer, I shall describe several specific embodiments of the same. It will be understood, however, that such are merely illustrative and in nowise limitative of the scope of the invention. It will be evident that concentrations of materials employed may be varied within relatively wide limits, and the same is true of temperatures, times of treatment, and the particular substances which are utilized in the processes. In a subsequent portion of this specification, I shall indicate in some detail the variations of which my novel teachings are susceptible and the scope of the novel aspects hereof.

One class of interface modifying agents whose treatment in accordance with the novel principles of my invention has given excellent results are the lower molecular weight sulpho-carboxylic acid esters of lipophile materials such as higher molecular weight alcohols. Substances of this class are disclosed, among other places, in United States Patents Nos. 1,917,250, 1,917,255, 2,028,091; in British Patent No. 377,249 and in my copending application, Serial No. 174,655, filed Nov. 15, 1937. These compounds may be made in various ways as, for example, by reacting a higher molecular weight alcohol such as lauryl alcohol with chloracetic acid or chloracetyl chloride and then reacting the resulting chloracetic acid ester of the alcohol with aqueous alkali sulphite such as potassium sulphite. This results in the production of an interface modifying agent in the form of a sulpho-carboxylic acid ester of an alcohol, in the specific instance indicated, lauryl potassium sulphoacetate having the formula

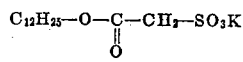

Other methods of preparing the sulpho-carboxylic esters may be employed as, for example, by esterifying a higher molecular weight alcohol, such as lauryl alcohol, with a lower molecular weight unsaturated acid such as butenoic acid—1 ($CH_3$—$CH$=$CH$—$COOH$) and then reacting the resulting ester with aqueous sodium bisulphite in accordance with the following reactions:

(1) 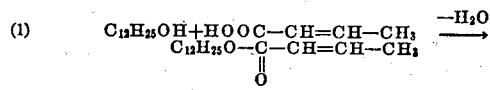

(2) 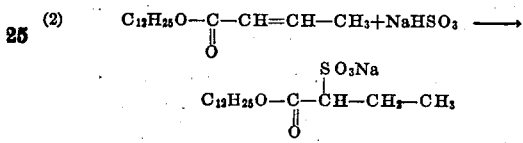

Still other methods of producing such interface modifying agents are disclosed in the patents and applications referred to hereinabove.

The following examples will indicate clearly the manner of treating interface modifying agents of the class of sulpho-carboxylic acid esters in accordance with the principles of my invention and will serve as a complete guide with respect to the practice of my invention as to other classes of interface modifying agents hereinafter disclosed.

*Example I*

Lauryl potassium sulphoacetate is soluble in water at room temperature to the extent of only about 0.1%. To convert it to the magnesium salt which is considerably more soluble, the following procedure was carried out.

The base exchange material utilized is that known as "Cristallite" which is a fine sand comprising a synthetic aluminum-changeable-ion hydrated silicate the exchange capacity of which, expressed in grains of calcium carbonate, was 12,000 to 15,000 grains of calcium carbonate per cubic foot of "Cristallite." In 100 cc. of loose "Cristallite" there were 38 cc. of spaces. The "Cristallite" was poured into a perpendicular glass tube, about 34 inches long and having an inside diameter of 1 1/16 inches, until the bed of "Cristallite" was about 17 inches high. The volume of the bed was 250 cc. The tubing was closed at the lower end with a one-hole rubber stopper fitted with a glass tube and a cock to control or arrest the flow of liquid. To prevent loss of the "Cristallite" and to retain the bed thereof intact, a fine mesh copper screen was utilized on which the bed rested.

About 400 cc. of a 20% aqueous solution of magnesium chloride was passed over the bed of "Cristallite" for about an hour, after which said solution was drained off and the thus treated "Cristallite" was washed carefully with about 400 cc. of cold water and finally with about 400 cc. of tap water at a temperature of approximately 65 degrees C. After substantially all of the water had been drained off, 300 cc. of a hot aqueous solution (65 degrees C.) containing 13% of lauryl potassium sulphoacetate were poured on the bed of "Cristallite" and allowed to stand for fifteen minutes. The solution was then drawn off slowly, the valve being adjusted to extend the flow over a period of about thirty minutes. The solution drawn off was brilliant, clear and limpid and did not freeze nor show any precipitation at 0 degrees C. Analyses showed that the resulting solution contained 13.1% of solids, and a magnesium determination employing standard methods showed that 67% of the theoretical amount of magnesium salt had been produced.

The times given above are illustrative and it is evident that adjustment may be required when the amount of materials treated is extensively modified.

*Example II*

Following the same general procedure as above, I produced the monoethanolamine salt of lauryl sulphoacetate in the following manner:

A 22½% monoethanolamine sulphate aqueous solution (400cc.) was first utilized to impart monoethanolamine cations to the base exchange material, this solution being allowed to pass over the base exchange material for about 20 minutes until tests showed that an adequate introduction of monoethanolamine ions had been effected. The conditioning solution was then withdrawn and the "Cristallite" washed, as previously. A hot aqueous solution containing 15% of lauryl potassium sulphoacetate was then passed through the bed of base exchange material and a limpid, clear solution containing 15.7% of solids obtained. An aliquot portion of the solution was digested with boiling concentrated $H_2SO_4$, the $H_2SO_4$ evaporated off, and the sulphate ash weighed. The weight of this ash corresponded to 2.8% of lauryl potassium sulphoacetate on the total dry substance, showing substantially the complete conversion of the potassium salt into the monoethanolamine salt. The solution obtained made a very valuable base for the production of detergent compositions such as shampoos or hair washes.

*Example III*

Following the same general procedure as above, I produced the ammonium salt of lauryl sulphoacetate in the following manner.

A 20% aqueous solution of ammonium sulphate was initially passed through the base exchange material, observing the general conditions described hereinabove. A hot aqueous solution containing 14% of lauryl potassium sulphoacetate yielded, when passed through the base exchange material, a limpid solution of lauryl ammonium sulphoacetate having a concentration of 13.8% solids. This solution did not show any solidification or separation at room temperature, but it froze at a temperature of 0° C. When warmed to room temperature again, however, it thawed out to form again a clear solution. Analyses showed that the potassium salt was almost fully converted into the ammonium salt.

*Example IV*

Following the same method, a 15% hot solution of monostearine sulphoacetate (potassium salt), at 70 degrees C., was passed through a base exchange material containing triethanolamine cations, previously prepared by passing an aqueous solution containing 20% of triethanolamine sulphate through the base exchange material. A clear solution was obtained comprising essentially the triethanolamine salt of monostearine sulpho-acetate, and this solution at room temperature and below remained clear, showing no evidence of precipitation.

Example V

In like manner, an alkali metal salt of hexadecyl sulpho-propionate was prepared containing 12% of solids, and at a temperature of 80 degrees C. was passed through a bed of base exchange material containing cations introduced therein by passing commercial triethanolamine sulphate in the form of a 20% aqueous solution therethrough. Commercial triethanolamine contains a substantial mixture of diethanolamine and monoethanolamine so that, when treated to form the sulphate, mono-, di- and triethanolamine sulphate were present. Accordingly, the ions of mono-, di- and triethanolamine were introduced into the base exchange material, and the solution of hexadecyl sulpho-propionate obtained by this method was a mixture of mono-, di- and tri- ethanolamine salts with a slight amount of unconverted alkali metal salt. The final solution was limpid and clear at room temperature and had detergent and foaming properties making it suitable for use as a liquid detergent.

Example VI

The sulphoacetic acid esters of mixed alcohols obtained by the catalytic hydrogenation of coconut oil mixed fatty acids were produced in the form of the potassium salt thereof, and a hot 10% aqueous solution was passed through a bed of base exchange material containing ions of mono-, di- and triethanolamine. A mixture of esters in the form of mono-, di-, and triethanolamine salts was produced, the solution thereof remaining clear and limpid at room temperature and considerably below room temperature. Substantially complete conversion to the ethanolamine salts was obtained.

It should be understood that the examples given hereinabove are merely illustrative both as to the type of sulphocarboxylic esters treated and the cations which exchanged in the treatment with the base exchange material. The compounds may be any lower molecular weight sulphocarboxylic acid esters of substances having esterifiable hydroxy groups, as the descriptive matter identifying such compounds amply shows. Furthermore, it will be clear that the sulpho-carboxylic acid radical of said esters may contain other groups such as —OH, —NH$_2$, —NR$_2$, $$-\overset{O}{\underset{\|}{C}}-NR_2, -\overset{H}{\underset{|}{C}}=O, >C=O, -\overset{O}{\underset{\|}{C}}-OH, -\overset{O}{\underset{\|}{C}}-OR, Cl, Br, I, F, -OSO_2H$$

—CN, —SCN, —SH, —NC, —PO$_3$H$_2$, —OPO$_3$H$_2$, —OR, where R is alkyl, aryl, or cyclo-alkyl, such as methyl, ethyl, propyl, cyclo-hexyl, phenyl, and the like.

As I have previously indicated, my invention may be practiced with the broad class of interface modifying agents, although to be sure, the advantages with respect to conversion thereof in accordance with my invention may vary relatively considerably depending upon the class of such agents involved.

The interface modifying agents with whose treatment the present invention is concerned are generally characterized by the presence of at least one higher molecular weight lipophile group containing preferably at least eight carbon atoms, preferably, although not necessarily, aliphatic in character, and by the presence of at least one hydrophile or hydrophillic group in the form of an oxygenated sulphur, phosphorus, carbon or boron radical, particularly sulphur in the form of sulphate or sulphonic acid radicals. Preferably, the lipophile and hydrophile groups are in a state of "balance" whereby the resulting compound has the property of reducing the spattering of margarine when used for frying. This concept of "balance" of lipophile and hydrophile groups is treated in considerable detail in the patent to Benjamin R. Harris, No. 1,917,250, issued July 11, 1933, and need not here be elaborated upon further. While this "balance" may be determined empirically by means of a margarine frying test, as described in said patent, those skilled in the art will, in most cases, readily be able to predict the existence of "balance" from merely an inspection of the structure of the molecule of the compounds themselves. As a general rule, the hydrophile and lipophile groups should preferably be at or near the ends or extremities of the molecule as, for example, in the case of lauryl potassium sulphate wherein the lauryl group or, in other words, the lipophile group, is present at one end of the molecule, and the sulphate or hydrophile group is present at the other end of the molecule. However, the invention is by no means so limited and in various instances the hydrophile group or groups may be present other than at an extremity of the molecule.

It will be understood that the term "lipophile group" includes groups having a definite affinity for oils and fats and comprises, for example, alkyl, aralkyl, aryl, ether or ester groups containing preferably at least eight carbon atoms. The lipophile group possesses predominantly hydrocarbon characteristics and, in general, is derived from triglyceride fats and oils, waxes, mineral oils, other hydrocarbons, and the like.

In contra-distinction thereto, the term "hydrophile group" or "hydrophillic group" includes groups which possess an affinity for water and aqueous media and which, in the instant case, include, among others, the following: sulphate, sulphonic, phosphate, pyrophosphate, tetraphosphate, borate, lower molecular weight sulphocarboxylic acids such as sulpho-acetates, sulphopropionates, polycarboxylic acids, hydroxy-carboxylic acids, etc.

Among the oxygenated sulphur derivatives, several members of which have excellent sudsing, foaming, frothing, lathering and detergent powers, are, as indicated, the higher molecular weight alcohol sulphates and sulphonates. The alcohols from which these sulphates and sulphonates may be prepared include the following: aliphatic straight chain and branched chain alcohols such as hexyl alcohol, heptyl alcohol, octyl alcohol, nonyl alcohol, decyl alcohol, undecyl alcohol, lauryl alcohol, myristyl alcohol, cetyl alcohol, oleyl alcohol, linoleyl alcohol, stearyl alcohol, ricinoleyl alcohol, palmitoeyl alcohol, melissyl alcohol, ceryl alcohol, carnaubyl alcohol, myricyl alcohol, branched chain octyl, decyl, dodecyl, tetradecyl, hexadecyl and octadecyl aliphatic alcohols as, for example, 2-ethyl hexanol-1, 2-n butyl octanol-1, 2-butyl tetradecanol-1, and, in general, the higher molecular weight saturated and unsaturated aliphatic straight chain and branched chain alcohols. Preferably, the alcohols which are utilized are those corresponding to the fatty acids occurring in triglyceride oils and fats of vegetable or animal origin, natural or hydrogenated, such as corn oil, cottonseed oil, sesame oil, coconut oil, palm kernel oil, sunflower seed oil, lard, tallow, soya bean oil and the like, those alcohols containing from 12 to 18 carbon atoms being preferred. Other alcohols which may be employed are the cyclo-aliphatic or alicyclic alcohols such as the sterols, as, for example, cholesterol, iso-cholesterol, phytosterol, sitosterol, hydroaromatic alcohols such as abietol, and such unsaturated alcohols as linalool, citronellol, geraniol and the like and hydrogenation products of the foregoing. Also included within the class of alcohols which may be employed are such compounds as the hydroxy and alpha-hydroxy higher aliphatic and fatty acids as, for example, ricinoleic acid, alpha-hydroxy stearic acid, alpha-hydroxy lauric acid, di-hydroxy stearic acid, 1-hydroxy-stearic acid, alpha-hydroxy palmitic acid, and the like, as well as esters of hydroxy-fatty acids, such as ethyl ricinoleate, castor oil, butyl alpha-hydroxystearate, cetyl hydroxystearate, and the like.

The term "alcohols", as employed herein, is intended to include alcohols which may or may not contain other groups such as carboxylic, halogen, sulphonic, sulphate, or other radicals. The alcohols obtainable by substituting alkyl or acyl radicals, preferably of high molecular weight, in place of the hydrogen of one or more hyroxy groups of polyhydroxy substances or polyhydric alcohols, it being understood that at least one hydroxy group attached to the nucleus of the polyhydroxy substance or polyhydric alcohol remains, are also within the scope of the alcohols from which the sulphates and sulphonates may be produced. As examples of such alcohols may be mentioned, partially esterified or partially etherified, sugars and sugar alcohols such as monolauric acid ester of sucrose, monostearic acid ester of dextrose, monopalmitic acid ester of mannitol, dicaproic acid ester of maltose, mono-octyl ether of sorbitol, monolauryl ether of pentaerythritol, monolauric acid ester of pentaerythritol, and the like; the monoglycerides and diglycerides, preferably of the higher fatty acids, as, for example, monolaurin, monomyristin, monostearin, distearin, diolein, dicaproin, monolauryl ether of glycerol, di-cetyl ether of glycerol, monostearic acid ester of diethylene glycol, monolauric acid ester of ethylene glycol, and the like.

It is, of course, obvious that the alcohols from which the sulphates and sulphonates may be produced may be prepared in accordance with any desired method. For example, many of these alcohols may be prepared by the so-called Bouveault and Blanc method or, alternatively, by the reduction or catalytic reduction with hydrogen of natural or hydrogenated animal or vegetable fats and oils, or mixtures thereof, in accordance with well known practices. Again the alcohols may be derived from synthetic processes such as by the oxidation of hydrocarbons or may be prepared by saponification of waxes and the like. Alternatively, they may be prepared by reduction of aldehydes or by the Grignard reaction.

It is likewise apparent that mixtures of the foregoing or other alcohols may be utilized in the preparation of the sulphates and sulphonates as, for example, the mixture of alcohols resulting from the hydrogenation of coconut oil or the free fatty acids of coconut oil. Lauryl alcohol comprises about 45% of the total alcohol mixture, the remaining alcohols running from $C_6$ to $C_{18}$.

Again, mixtures of alcohols such as are present in the so-called sperm oil alcohols, as well as those present in wool-fat, may equally efficaciously be utilized. Indeed, these higher molecular weight alcohols are generally offered on the market in the form of mixtures of different alcohols. If desired for any specific purpose, special fractions which predominate in a certain particular higher molecular weight alcohol may be utilized or, if so desired, the products may be prepared from a single, substantially pure alcohol.

These sulphates and sulphonates, described hereinabove, may, in general, be represented by the formula

$$(R\text{---}(X)_m\text{---})_n Y$$

wherein R is a radical containing a hydrocarbon chain of at least eight carbon atoms, X is a sulphuric or sulphonic group present preferably at or near an extremity of the radical represented by R, Y is a cation or the radical of a salt forming compound, and $m$ and $n$ are small whole numbers, at least one.

In a still more specific aspect of this class of compounds, the sulphates may be represented by the formula

$$(R\text{---}O\text{---}SO_3\text{---})_n Y$$

wherein R represents the residue of a normal primary alcohol containing from 8 to 18 carbon atoms, Y represents a cation or the residue of a salt-forming compound such as sodium, monoethanolamine or the like, and $n$ is a small whole number, at least one.

The sulphates and sulphonates described are usually prepared and commercially distributed in the form of salts. The acid sulphates, for example, may be neutralized with suitable anti-acid materials and, in this connection, considerable latitude and modification may be exercised. In general, inorganic as well as organic anti-acid agents may be employed, examples of which are carbonates, bicarbonates and hydroxides of the alkali metals (including ammonium), sodium oxide, ammonia gas, potassium stearate, sodium stearate, magnesium oxide, magnesium carbonate, organic anti-acid nitrogenous materials including amines, alcohol and alkylol amines such as, for example, mono-, di-, and triethanolamine and mixtures thereof, propanolamines, butanolamines, polynitrogenous amines such as ethylene diamine, ethylene triamine and the like, pyridine, methyl-pyridine, piperidine, quaternary ammonium bases such as tetra-ethyl ammonium hydroxide, tetra-methyl ammonium hydroxide, and, in general, primary, secondary and tertiary amines substituted or not with other radicals such as hyroxy, alky, aryl, cyclo-alkyl groups, and the like. It will be understood that by the term "cation", as used herein, is meant such elements as have been mentioned and, in general, atoms or radicals which are regarded as bearing a positive charge or capable of replacing acidic hydrogen. The reaction products may be neutralized to any extent desired as, for example, to methyl orange, litmus or phenolphthalein. The sulphates and sulphonates referred to hereinabove are described, among other places, in the following United States patents: 1,897,741, 1,968,793, 1,968,-794, 1,968,796, 1,968,797, 2,006,309, 2,023,387, 2,-052,027, and 2,077,005.

The interface modifying agents in the form of oxygenated phosphorus derivatives, which may be treated in accordance with the principles of the present invention, are those compounds which correspond to the higher molecular weight alcohol sulphates and sulphonates described hereinabove but wherein the hydrophile group comprises oxygenated phosphorus instead of oxygenated sulphur. Among these compounds may be mentioned lauryl sodium pyrophosphate, palmityl potassium orthophosphate, lauryl sodium tetraphosphate, oleyl moneathanolamine pyrophosphate, monolauric acid ester of diethylene glycol tetraphosphate, potassium salt, and the like. These compounds are disclosed, among other places, in the following United States patents and pending applications: 2,026,785, 2,052,029, 2,053,653; application of Benjamin R. Harris, Serial No. 106,194, filed October 17, 1936; application of Morris B. Katzman, Serial No. 135,931, filed April 9, 1937.

Again, in place of either the oxygenated phosphorus or oxygenated sulphur compounds, similar as well as corresponding oxygenated boron compounds may be treated. These include boric acid esters of monoglycerides of higher fatty acids such as monolaurin sodium borate. For a more complete description of such or similar boric acid derivatives, reference may be had to United States Patent No. 2,052,192.

Still another group of interface modifying agents in the form of sulphonic and sulphate derivatives which may be treated in accordance with the teachings of the present invention are the compounds which correspond to the general formulae:

(1)      R—CO—NX$_n$(YM)$_w$

(2)      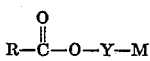

wherein R is an aliphatic hydrocarbon radical containing at least 7 carbon atoms and preferably between 11 and 17 carbon atoms, X is hydrogen, $n$ is either zero or one, Y is a lower molecular weight alkylene or substituted alkylene radical such as —C$_2$H$_4$—, —C$_3$H$_6$—, —C$_4$H$_8$—, or the like, M is an oxygenated sulphur-containing inorganic acid radical such as —OSO$_3$Na, —SO$_3$K, or the like, and $w$ is a small whole number. As illustrative of these compounds may be mentioned the following:

a.      C$_{11}$H$_{23}$—CO—NH—C$_2$H$_4$—SO$_3$K
b.      C$_{17}$H$_{33}$—CO—NH—C$_2$H$_4$—SO$_3$Na
c.      C$_{11}$H$_{23}$—CO—O—C$_2$H$_4$—SO$_3$Na
d.      C$_{15}$H$_{31}$—CO—O—C$_2$H$_4$—SO$_3$NH$_4$
e.      C$_{11}$H$_{23}$—CO—NH—C$_2$H$_4$—OSO$_3$Na
f.      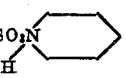
g.      C$_{11}$H$_{23}$—CO—O—C$_2$H$_4$—OSO$_3$Na Compounds of the general type and others of similar nature are disclosed in the following United States patents: 1,931,540, 1,932,177, 1,932,180, and 1,981,792. It will be understood that the radical R in the above general formulae may be derived from higher aliphatic, fatty, cycloaliphatic, aromatic, and hydroaromatic acids, saturated and unsaturated, such as the following: caprylic acid, caproic acid, capric acid, melissic acid, behenic acid, erucic acid, cerotic acid, stearic acid, oleic acid, ricinoleic acid, linoleic acid, linolenic acid, lauric acid, myristic acid, palmitic acid, mixtures of any two or more of the above mentioned acids or other acids, mixed higher fatty acids derived from animal or vegetable sources, for example, lard, coconut oil, sesame oil, corn oil, cottonseed oil, sardine oil, tallow, partially or completely hydrogenated animal and vegetable oils such as those mentioned; hydroxy and alpha-hydroxy higher aliphatic and fatty acids such as i-hydroxy stearic acid, dihydroxystearic acid, alpha-hydroxy stearic acid, alpha-hydroxy palmitic acid, alpha-hydroxy lauric acid, alpha-hydroxy coconut oil mixed fatty acids, and the like; aliphatic acids derived from various waxes such as beeswax, spermaceti, montan wax, and carnauba wax and higher molecular weight carboxylic acids derived, by oxidation and other methods, from petroleum; hydroaromatic acids such as abietic acid; aromatic acids such as naphthoic acid, hydroxy aromatic acids such as hydroxy naphthoic acids, and the like and substitution and addition derivatives of the aforementioned acids, in particular, halogen addition and substitution derivatives.

Still another class of interface modifying agents in the form of sulphonic derivatives which may be treated in accordance with the teachings of the present invention are the sulphonated derivatives of alkylated or aralkylated polynuclear hydrocarbons such as, for example, butyl naphthalene sulphonic acid mono-sodium salt, benzyl naphthalene sulphonic acid mono-potassium salt, isopropyl naphthalene sulphonic acid mono-sodium salt, etc. Particularly contemplated are the salts of those polynuclear derivatives, such as those of naphthalene, which contain alkyl, aralkyl or hydroaromatic radicals with three carbon atoms and upwards. These compounds are, in general, disclosed in United States Patent No. 1,752,184.

A further group of interface modifying agents which may be treated in accordance with the principles of the present invention are salts, esters and amides, of higher molecular weight carboxylic acids and derivatives thereof wherein at least one hydrogen attached to the carbon atom adjacent to the carboxyl group of said carboxylic acids is replaced by a radical having strong hydrophillic properties comprising, for example, oxygenated sulphur and oxygenated phosphorus radicals. Examples of such compounds are as follows:

(1) 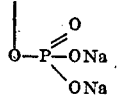

(2) 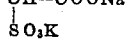

(3) 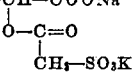

Other compounds falling into this category are disclosed in the copending application of Frank J. Cahn, Serial No. 135,957, filed April 9, 1937.

Another class of interface modifying agents which may be treated in accordance with the novel principles of the present invention comprises those compounds which correspond, in general, to the formula

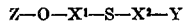

wherein X$^1$ and X$^2$ represent members selected from the group consisting of alkylene and substituted alkylene groups, Z represents a lipophillic group, and Y represents a hydrophillic group in the form of a salt such as sulphate, sulphonic, phosphate, phosphonic, and the like. Illustrative of such compounds are the following:

(a) $CH_3-(CH_2)_8-\overset{O}{\underset{\|}{C}}-O-CH_2-CH_2-S-CH_2-CH_2-O-SO_3Na$ (b) $CH_3-(CH_2)_8-\overset{O}{\underset{\|}{C}}-O-CH_2-\underset{OH}{\overset{}{C}H}-CH_2-S-CH_2-\underset{OH}{\overset{}{C}H}-CH_2-SO_3K$ Other compounds of this class are disclosed in the copending application of Benjamin R. Harris, Serial No. 157,949, filed August 7, 1937.

Many of the interface modifying agents such as, for example, various of the sulphocarboxylic acid esters, are very valuable agents for the preparation of shampoos, hair washes, and the like in view of their excellent sudsing, lathering, foaming and detergent properties. Concentrations of such substances, as high as, for example 10 or 15% in aqueous media produce excellent shampoos or hair washes. Many of the salts, for example, the sodium and potassium salts, however, are not adequately soluble so that a commercially satisfactory shampoo product could be made by their use. These alkali metal salts, however, usually possess satisfactory solubility characteristics at elevated temperatures in that solutions in hot water as high as 10% to 25% or more in many cases are readily obtained. By first producing the hot water-soluble salt by the most satisfactory methods considering sources of raw materials, yields and the like, and forming a solution in hot water of such salt, I have been able to convert such salt while in hot solution readily into the modified salt, such as a magnesium or triethanolamine salt or the like which is adequately soluble in cold water or water at room temperature.

In certain instances, it may be desirable simply to convert one salt of an interface modifying agent into a different salt of said interface modifying agent without regard to the particular advantages for the obtention of which my invention finds its greatest importance and practicality. In such a case, for example, one may have a particular salt of an interface modifying agent at hand and desire to convert it into another salt without regard to whether the desired salt is more or less soluble than the salt at hand. The novel teachings of my invention may be employed for such a purpose. However, as previously indicated, the present greatest utility of my invention appears to be in converting interface modifying agents which are normally possessed of relatively low solubility in cold water but are quite soluble in hot water into agents with susbtantially enhanced solubility in cold water.

The salts of the interface modifying agents which may be produced by my invention are many and varied, the only requirement being that they be soluble in some measure in either hot or cold water. Among the inorganic salts which may be prepared are the alkali metal (including ammonium) and alkaline earth salts, such as the sodium, potassium, calcium and magnesium salts as well as the salts of the so-called heavy metals. Substituted ammonium or organic nitrogenous base salts may also efficaciously be prepared, included within which class are, for example, the salts of alcohol amines and alkylolamines including monoethanolamine, diethanolamine, triethanolamine, propanolamines, butanolamines, pentanolamines, glycerolamines, dibutyl ethanolamine, diethanol ethyl amine, cyclohexyl ethanolamine, alkylol polyamines such as alkylol derivatives of ethylene diamine, mono-methyl mono-ethanolamine, diethyl monoethanolamine, 1-amine-2, 3-propanediol, 1,2-diamino-propanol; alkylamines such as butylamine, dimethylamine, ethylene diamine, diethylene triamine, triethylene tetra-amine, mono-methyl ethylene diamine, hydrazine and susbtituted hydrazines, aromatic and heterocyclic bases and cyclic nitrogenous substances such as pyridine, quinaldine, piperidine, methylpyridine, and homologues and derivatives thereof, quaternary ammonium bases or hydroxides such as tetra-methyl ammonium hydroxide, tetra-ethyl ammonium hydroxide, quaternary ammonium bases with dissimilar alkyl radicals such as methyl-triethyl ammonium hydroxide, propyl-trimethyl ammonium hydroxide, mixtures of any two or more thereof, and the like. It will be understood that these organic nitrogenous bases may be employed in pure, impure or commercial form such as, for example, commercial triethanolamine which contains minor proportions of mono- and di-ethanolamine. The tabulation of specific salts given hereinabove is by no means meant to be exhaustive, but it affords to those skilled in the art more than an adequate exemplification of the practice of my invention.

It will be apparent that I may employ any of the known base exchange substances, natural or synthetic, inorganic and organic, such as the zeolites, greensands, glauconites, harmotones, certain synthetic resins, etc. I prefer to employ a base exchange material with great exchange capacity and I have found that the product referred to previously and known as "Cristallite" is admirably suited for my purposes.

By the term "solution", as employed herein, it will be understood that it is intended to include not only true solutions but also so-called colloidal dispersions.

The term "higher", as employed herein, is intended to mean not less than eight carbon atoms and, concomitantly, the term "lower" will be understood to mean less than eight carbon atoms, unless otherwise specifically stated.

What I claim as new and desire to protect by Letters Patent of the United States:

1. The method of converting a salt of an organic interface modifying agent, having a lipophile group with at least six carbon atoms and a hydrophile group, which possesses relatively poor cold-water solubility, into a different salt of otherwise the same interface modifying agent which possesses substantially enhanced cold-water solubility which comprises preparing a hot solution containing at least several percent of said first mentioned salt of an interface modifying agent and passing the same into contact with a base exchange material containing replaceable cations of said second-mentioned salt whereby an exchange of cations takes place to produce the salt having the enhanced cold-water solubility.

2. The method of converting an alkali metal salt of an organic interface modifying agent, having a lipophile group with at least six carbon atoms and a hydrophile group in the form of a member selected from the group consisting of oxygenated sulphur, oxygenated phosphorus, and oxygenated boron radicals, which salt possesses relatively low cold-water solubility, into a different salt of said interface modifying agent which possesses substantially enhanced cold-water solubility, which comprises preparing a hot solution containing at least several percent of said alkali metal salt of an interface modifying agent and then passing the same into contact with a base exchange material containing replaceable cations of said different salt whereby an exchange of cations takes place to produce the salt having the enhanced cold-water solubility.

3. The method of claim 1 wherein the initial salt of the interface modifying agent has a solubility in water at room temperature of the order of not substantially in excess of 1%, and the final salt of said interface modifying agent has a solubility in water at room temperature of the order of at least 5%, said percentages being by weight.

4. The method of converting a salt of an organic interface modifying agent, having a lipophile group with at least six carbon atoms and a hydrophile group, which possesses relatively poor cold-water solubility, into a different salt of otherwise the same interface modifying agent which possesses substantially enhanced cold-water solubility, which comprises preparing a hot aqueous solution containing at least about 8%, by weight, of said first-mentioned salt of an interface modifying agent and passing the same into contact with a base exchange material containing replaceable cations of said second-mentioned salt whereby an exchange of cations takes place to produce the salt having the enhanced cold-water solubility.

5. The method of claim 4 wherein the interface modifying agent comprises a member selected from the group consisting of oxygenated sulphur, oxygenated phosphorus and oxygenated boron derivatives of a higher molecular weight alcohol containing at least eight carbon atoms and selected from the group consisting of aliphatic and cycloaliphatic alcohols.

6. The method of claim 4 wherein the finally produced salt of the interface modifying agent has good sudsing, lathering and detergent properties and comprises a member selected from the group consisting of sulphate, sulphonate, phosphate and borate derivatives of lipophile materials.

7. The method of claim 4 wherein the finally produced interface modifying agent is an alcohol amine salt.

8. The method of claim 4 wherein the finally produced interface modifying agent is a salt of an alkylolamine selected from t    group consisting of monoethanolamine, diethanolamine, triethanolamine, and mixtures thereof.

9. The method of converting a salt of an organic interface modifying agent selected from the group consisting of sulphates, sulphonates, phosphates and borates of aliphatic alcohols containing from 12 to 18 carbon atoms which comprises passing an aqueous solution of said salt through a bed of a base exchange material containing cations of a salt to be produced, whereby to cause an exchange of cations and produce a salt different from the salt initially passed through the bed of said base exchange material.

10. In the treatment of a salt of an interface modifying agent, having a lipophile group with at least six carbon atoms and a hydrophile group, the step of passing an aqueous solution of such salt through a bed of a base exchange material containing the cations of a salt to be produced, whereby to cause an exchange of cations and produce a salt of said interface modifying agent different from the salt passed through the bed of said base exchange materials.

11. In the treatment of interface modifying agents in the form of alkali metal salts of oxygenated sulphur derivatives of high molecular weight alcohols containing at least eight carbon atoms and selected from the group consisting of aliphatic and cycloaliphatic alcohols, the method of converting such of said salts which are relatively sparingly soluble in cold water to salts which are more soluble in cold water, which includes the step of passing a hot solution of said first mentioned salts through a bed of a base exchange material which contains the cation of the said salt which is more soluble in cold water.

12. In the treatment of interface modifying agents in the form of salts of oxygenated sulphur derivatives of a member selected from the group consisting of aliphatic and cycloaliphatic alcohols containing from 12 to 18 carbon atoms and which are soluble in water at room temperature to the extent of less than about 1%, the step of passing a hot solution of a salt of said derivatives over a bed of a base exchange material containing the cations of a salt to be produced, whereby to cause an exchange of cations and produce a salt of said otherwise the same interface modifying agent which is soluble to the extent of at least about 8% in water at room temperature, said percentages being by weight.

13. In the treatment of interface modifying agents in the form of alkali metal salts of sulphonates of higher molecular weight alcohols containing at least eight carbon atoms and selected from the group consisting of aliphatic and cycloaliphatic alcohols, the method of converting such of said salts which are relatively sparingly soluble in cold water to such organic nitrogenous base salts which are appreciably more soluble in cold water, which includes the step of passing a hot aqueous solution of the alkali metal salt through a bed of a base exchange material which contains the organic nitrogenous base cations corresponding to the said salt which is appreciably more soluble in cold water.

14. In the treatment of interface modifying agents in the form of sulphonates of coconut oil mixed fatty alcohols, the step of passing an alkali metal salt thereof through a bed of base exchange material containing an exchangeable cation of an organic nitrogenous base whereby to form a nitrogenous base salt of said sulphonate.

15. In the treatment of interface modifying agents in the form of sulphonates of higher molecular weight aliphatic alcohols consisting predominantly of lauryl alcohol, the step of passing an alkali metal salt thereof through a bed of base exchange material containing an exchangeable ethanolamine cation whereby to produce an ethanolamine salt of said sulphonate.

16. The method of converting an inorganic base salt of an interface modifying agent in the form of a sulphonate of a higher molecular weight aliphatic alcohol into an organic base salt thereof which comprises passing a solution of said inorganic base salt through a bed of a base exchange material containing cations of an organic base substance.

17. The method of converting an interface modifying agent in the form of an alkali metal salt of lauryl sulphonate into a salt which is soluble at least to the extent of about 8%, by weight, in water at room temperature, which comprises making a hot aqueous solution containing at least about 8%, by weight, of said alkali metal salt, and passing said solution, while hot, through a bed of base exchange material containing replaceable cations of a more soluble salt whereby to replace the alkali metal ion with the cations of the base exchange material and form a solution of a salt of lauryl sulphonate which, in the concentration present, will remain clear at room temperature.

18. The method of converting an interface modifying agent in the form of an alkali metal salt of a sulphonated derivative of lauryl alcohol into an alcohol amine salt thereof, which comprises forming a hot aqueous solution containing at least several percent of said alkali metal salt, and passing said solution, while hot, through a bed of base exchange material containing replaceable alcohol amine ions, whereby to effect an exchange of cations and obtain an alcohol amine salt which is soluble at least to the extent of several percent in cold aqueous media.

BENJAMIN R. HARRIS.